3,548,001
PROCESS FOR MAKING ALKYL
TERTIARY AMINES
Zdzislaw J. Dudzinski, Clifton, N.J., assignor to Millmaster Onyx Corporation, New York, N.Y., a corporation of New York
No Drawing. Filed May 8, 1967, Ser. No. 636,664
Int. Cl. C07c 87/127
U.S. Cl. 260—583                                    7 Claims

ABSTRACT OF THE DISCLOSURE

Tertiary aliphatic amines are prepared by the reaction of 1-chloroalkanes or 1-bromoalkanes with secondary amines in a solventless environment at a temperature at least as high as room temperature, by preferably ranging from about 100° to 160° C., and at a pressure of about ambient for high boiling reactants and about 285 to 350 p.s.i. for low boiling or gaseous reactants. An alkali is preferably also present in the reaction mixture.

---

This invention relates to the preparation of aliphatic amines, and it particularly relates to the preparation of tertiary amines by the reaction of either 1-chloroalkanes or 1-bromoalkanes and secondary amines in the absence of a solvent.

In many instances, especially when there is any great excess of the halogented hydrocarbon, there is a secondary reaction with at least some of the produced tertiary amine to form quatenary ammonium compounds. When the reaction is conducted in a solvent medium, such as heretofore used, these quaternaries, even when present in very small amounts, had a deleterious effect on the reaction, causing emulsification when the free amine was separated from the liquid medium, and causing pyrolysis during distillation.

Furthermore, there is usually present in the reaction mixture a certain amount of alkali which is generally necessary to permit effective extraction. In a solvent medium, the reaction produces a mixture of hydrohalide salts of both the reacting and produced amines. When the alkali is present, both of these hydrohalide salts tend to be liberated by the alkali as free amines. These free amines increase the possibility of further secondary reaction with the produced tertiary amine to form quaternaries. The alkali, additionally, has a tendency to saponify the alkyl halides.

In accordance with the present invention, all the aforementioned disadvantages are obviated by conducting the reaction in the absence of a solvent under predetermined conditions. Furthermore, the tertiary amines are of excellent quality and are produced in more satisfactory yield than was generally the case when using solvents.

The following examples are illustrative of the present invention, without any intent, however, to limit the scope of the invention except as claimed:

EXAMPLE 1

8 mols (2,008 gms.) of n-dodecyl bromide were charged into a stainless-steel autoclave, together with 24 mols (1,080 gms.) of liquid dimethylamine and 8.8 mols (352 gms.) of solid NaOH.

The mixture was then gradualy heated to about 140–150° C., under agitation, and then held at that temperature for a total of 3 hours, at a pressure of about 320 p.s.i. At the end of this period, the excess of dimethylamine was stripped off, in the standard manner, and recovered.

The residue was found to be a mixture of dodecyl dimethylamine. Solid sodium bromide and excess sodium hydroxide. The crude amine was isolated by washing with water and drying in vacuo.

Analysis disclosed a substantially complete absence of quaternary ammonium compounds and a yield of n-dodecyl dimethylamine in an amount corresponding to about 100% of the theoretical amount based on the amount of dodecyl bromide charged.

EXAMPLE 2

The same process was used as in Example 1, except that 6 mols (1,749 gms.) of a mixture of n-myristyl and n-cetyl bromides were reacted with 18 mols of liquid dimethylamine and 6.6 mols of solid sodium hydroxide for a period of 3.5 hours at a temperature of about 150° C. and a pressure of about 285 p.s.i.

The yield of mixed n-higher alkyl dimethylamine was about 100% of the theoretical, and with substantially no quaternary ammonium compounds present.

EXAMPLE 3

The same procedure was used as in Example 1, except that the sodium hydroxide was omitted. The reaction was complete after 4 hours.

Analysis disclosed a yield of n-dodecyl dimethylamine in an amount of about 98% of the theoretical and a quaternary ammonium compound was present in about 1.4%.

EXAMPLE 4

The same mixture of myristyl-cetyl bromide, liquid dimethylamine and solid sodium hydroxide as used in Example 2, was used in exactly the same amount and in the same manner as in Example 2, except that the reaction temperature was maintained at about 120° C., for a period of 10 hours.

The yield of tertiary amine was substantially 100% of the theoretical, no quaternary being found.

EXAMPLE 5 n-Dodecyl bromide was reacted, in the same manner as in Example 1, with an isopropanol solution of dimethylamine, the solution assaying 33.5% by weight dimethylamine and 5.2% by weight water. The charge contained 5 mols of n-dodecyl bromide and 12.5 mols of dimethylamine. After 5 hours at 115° to 120° C., the reaction was complete. The product was then neutralized with sodium hydroxide, stripped of dimethylamine, separated from the brine, and then filtered to obtain greater clarification.

The crude amine recovered contained 4.1% of a quaternary ammonium compound; substantially more than in a solventless environment.

EXAMPLE 6

9 mols (1,926 gms.) of n-lauryl chloride, 22.5 mols (1,013 gms.) of liquid dimethylamine and 396 gms. of solid sodium hydroxide were charged into a stainless-steel autoclave, and the mixture was heated for 3 hours at a temperature of 140°–150° C., under agitation. At the end of this period, the reaction was complete.

The product was cooled and washed at 70° C. with a 15% solution of sodium chloride, and dried under reduced pressure at 75° C., after which the residual salts were removed by filtration.

Analysis disclosed a yield of 96% of the theoretical of n-lauryl dimethylamine. No quaternary ammonium compounds were found.

In order to demonstrate the difference between the above reaction in a solventless environment and a similar reaction in the presence of a solvent, the procedure was used as in the following example.

EXAMPLE 7

5 mols of the same n-lauryl chloride as used in Example 6, plus 12.5 mols of a 29.4% by weight solution of dimethylamine in isopropanol containing 4.7% by weight water, was reacted in the autoclave for 5 hours at 110°–120° C., at the end of which the reaction was complete.

The crude lauryl dimethylamine, recovered in the same manner as in Example 6, was then neutralized, stripped, etc., as in Example 5.

The product contained 91.6% by weight of n-lauryl dimethylamine and 2.6% by weight of a quaternary ammonium compound.

Since in Example 6 no quaternary appeared to be present, there was a substantial difference in this regard between the process of Examples 6 and 7, even though no sodium hydroxide was used in Example 7. If sodium hydroxide had been used, the amount of quaternary would obviously have been even higher.

In addition to the above-disclosed chlorides and bromides, other higher alkyl halides, such as decyl, stearyl, etc., may be used. Such homologous halides are used in the identical manner as disclosed in the above examples and react in the same manner to produce the homologous tertiary amines.

It is also within the scope of the present invention to substitute other secondary amines for the dimethylamine disclosed above. Such other secondary amines include, for example, not only other lower alkyl amines such as diethylamine, ethyl methyl amine, etc., but also alkanolamines such as diethanolamine, methyl-ethanol amine, etc. It also includes such compounds as morpholine and analogous compounds. These other secondary amines are used in the same manner and react in a similar way to produce corresponding analogous tertiary amines, as illustrated by the following examples:

EXAMPLE 8

A round-bottom, three-necked flask, fitted with an agitator and gas inlet and outlet tubes, was charged with n-dodecyl bromide, diethanolamine and sodium carbonate in the respective molar proportions of 1:1.5:1.1. The air was displaced with nitrogen, and this nitrogen atmosphere was maintained while the temperature was brought to 120° C., and the pressure was maintained at substantially atmospheric pressure. The reaction was then allowed to take place at this temperature and pressure for about 3 hours.

The product was thereafter washed at 70° C. with a sodium chloride solution, stripped of water at 70°–80° C. under reduced pressure, and filtered to remove residual salt. The resultant product was a high-quality dodecyl diethanolamine in a yield of substantially the theoretical amount.

EXAMPLE 9

The same apparatus was used as in Example 8, but with the addition of a reflux condenser before the gas outlet tube. The charge consisted of n-dodecyl bromide, morpholine and sodium carbonate in the respective molar proportions of 1:1.2:1.1. The reaction proceeded over a period of about 6 hours at about 120°–130° C. and a pressure of substantially atmospheric pressure. Substantially the theoretical amount of dodecyl morpholine was recovered.

It will be noted that elevated temperatures and pressures are used wherever the amine reactant is a gas or a liquid of low boiling point. The temperature may be as low as room temperature, but is preferably between 100° and 160° C. for most rapid results correlated with satisfactory appearance and yield, although higher temperature can be used if the pressures are made correspondingly higher.

EXAMPLE 10

A round-bottom, three-necked glass flask, fitted with an agitator and gas inlet and outlet tubes was charged with 4 mols (928 gms.) of n-lauryl chloride, 4.4 mols (462 gms.) of diethanolamine, and 4 mols (425 gms.) of sodium carbonate.

The air in the flask was displaced with nitrogen gas, and the nitrogen atmosphere was maintained while the charge was heated to 160°–165° C. for a period of 2 hours, at atmospheric pressure and under agitation, until the reaction was complete. The product was then cooled and washed at 70° C. with a 15% sodium chloride solution.

The product was dried by stripping off the water under reduced pressure at 70°–80° C., after which residual amounts of salts were removed by filtration.

A product of 99% pure n-lauryl diethanolamine was obtained.

EXAMPLE 11

Using the same process as in Example 10, mixed (n-cetyl, n-stearyl) chloride was reacted with a 1.1 molar proportion of diethanolamine and a 1 molar proportion of sodium carbonate to yield a product, (n-cetyl, n-stearyl) diethanolamine, of 95% quality.

EXAMPLE 12

In the same apparatus as in Example 10, with the addition of a reflux condenser before the gas outlet tube, a charge was heated, under agitation, for 12 hours at 150°–155° C. The charge consisted of 4 mols (928 gms.) of n-lauryl chloride, 4.8 mols (420 gms.) of morpholine, and 4.33 mols (460 gms.) of sodium carbonate.

The product was washed at 70° C. and stripped of water at 70°–80° C. under reduced pressure. It was then purified of salts by filtration.

The product, n-lauryl morpholine, was 97.2% pure.

Obviously, many modifications of the present invention are possible in the light of the above teachings. It is, therefore, to be understood that within the scope of the appended claims, the invention may be practiced otherwise than as specifically described.

The invention claimed is:

1. A method of making a tertiary amine which comprises reacting in the absence of a solvent a 1-haloalkane with a greater than stoichiometric amount of either dimethylamine, diethylamine, or ethyl methyl amine, at a temperature which is at least as high as room temperature, and for a period of time which is effective to cause the reaction to go to completion.

2. The method of claim 1, wherein the 1-haloalkane is 1-chloroalkane.

3. The method of claim 1, wherein the 1-haloalkane is 1-bromoalkane.

4. The method of claim 1, wherein the temperature is between about 100° and 160° C.

5. The method of claim 1, wherein an alkali in substantially equivalent molecular amount relative to the 1-haloalkane is also present in the reaction mixture.

6. The method of claim 1, wherein the alkane moiety of the 1-haloalkane is a higher alkane having 12 to 18 carbon atoms.

7. The method of claim 6 wherein the alkali is a member of the group consisting of sodium hydroxide and sodium carbonate.

References Cited

UNITED STATES PATENTS 3,436,420  4/1969  Dudzinski _____ 260—583

OTHER REFERENCES

Ed. F. Degering: Organic Chemistry, sixth ed., 1951, p. 142, Barnes & Noble Inc.

ALEX MAZEL, Primary Examiner

J. TOVAR, Assistant Examiner

U.S. Cl. X.R.

260—247; 584